United States Patent
Will et al.

(10) Patent No.: US 7,522,760 B1
(45) Date of Patent: Apr. 21, 2009

(54) METHOD FOR INSPECTING DOCUMENT IMAGES

(75) Inventors: Terry Anthony Will, Charlotte, NC (US); Mike (Mahmoud) Chouffani, Mooresville, NC (US)

(73) Assignee: Carreker Corporation, Dallas, TX (US)

( * ) Notice: Subject to any disclaimer, the term of this patent is extended or adjusted under 35 U.S.C. 154(b) by 698 days.

(21) Appl. No.: 10/686,592

(22) Filed: Oct. 17, 2003

(51) Int. Cl.
*G06K 9/00* (2006.01)

(52) U.S. Cl. .................. 382/137; 382/101; 382/112; 382/172

(58) Field of Classification Search ............... 382/111, 382/112, 140, 137
See application file for complete search history.

(56) References Cited

U.S. PATENT DOCUMENTS

| | | | |
|---|---|---|---|
| 4,504,873 A | 3/1985 | Bandy et al. | |
| 4,590,606 A | 5/1986 | Rohrer | |
| 4,888,812 A | 12/1989 | Dinan et al. | |
| 5,687,250 A * | 11/1997 | Curley et al. ............... | 382/112 |
| 5,692,065 A | 11/1997 | Prakash et al. | |
| 5,754,671 A * | 5/1998 | Higgins et al. .............. | 382/101 |
| 5,754,674 A * | 5/1998 | Ott et al. ...................... | 382/112 |
| 5,784,610 A | 7/1998 | Copeland, III et al. | |
| 5,790,711 A * | 8/1998 | Murakami ................... | 382/267 |
| 6,081,625 A * | 6/2000 | Sakaue ......................... | 382/254 |
| 6,198,845 B1 * | 3/2001 | Tse et al. ..................... | 382/169 |
| 6,243,502 B1 | 6/2001 | Christensen et al. | |
| 6,278,463 B1 | 8/2001 | Chapman et al. | |
| 6,363,162 B1 * | 3/2002 | Moed et al. .................. | 382/112 |
| 6,507,670 B1 * | 1/2003 | Moed .......................... | 382/172 |

* cited by examiner

*Primary Examiner*—Samir A. Ahmed
*Assistant Examiner*—Aklilu k Woldemariam
(74) *Attorney, Agent, or Firm*—Sutherland Asbill & Brennan LLP

(57) ABSTRACT

A method for processing document image data wherein the quality of the document image is determined by examination of a vital document area includes determining a confidence level for the document by calculating two or more confidence factors for each vital document area. These confidence levels include calculations based on number, mass, and quality of identified characters within the vital area, the distribution of pixels horizontally across the document, and empirically determined norms for image density and distribution. The confidence levels are combined to give a confidence level for the document image quality.

15 Claims, 2 Drawing Sheets

METHOD FOR INSPECTING DOCUMENT IMAGES

BACKGROUND OF THE INVENTION

1. Field of the Invention

The present invention relates to electronic image capture and analysis, and specifically to the capture and analysis of bank documents such as checks, deposit slips, withdrawal requests, and other transaction records.

2. Description of Related Art

The current economic environment requires the efficient processing of bank documents such as, checks, deposit slips, withdrawals, and other transactions. These documents are processed by creating electronic digital images, where the resulting images are archived, replacing microfilm repositories. It is important that the captured images by of "acceptable" quality when saved, as subsequent processing, whether it be for record-keeping, dispute, research, documentation or a large number of other actions, is dependent on the ability to reproduce the original document from the saved image.

Recently, the ability to use digital images for transaction processing has advanced to the point where saved images are as valid as the original document. On Jun. 25, 2003, the United States Congress passed the Check Truncation Act of 2003 to "facilitate check truncation by authorizing substitute checks, to foster innovation in the check collection system without mandating receipt of checks in electronic form, and to improve the overall efficiency of the Nation's payments system." In this Act the term "truncate" means "to remove an original paper check from the check collection or return process and send to a recipient, in lieu of such original paper check, a substitute check or, by agreement, information relating to the original check (including data taken from the MICR line of the original check or an electronic image of the original check), whether with or without subsequent delivery of the original paper check."

In an environment where the original document is kept only as the electronic facsimile, and is the basis for "substitute" documents, accepted as the original, image quality is vitally important.

Current art includes the mechanical and electronic scanning and capture of bank documents (checks, deposit slips, etc.), where a document is moved beneath a light source and magnetic reading device (for MICR characters). The captured image is then processed by hardware and software systems to collect, examine, process, store, and label the document image. Such systems are prone to physical, optical, mechanical, and environmental conditions that lead to poor image quality. For example, dirt or dust on the document or on the optical light source or lens; poorly focused optical equipment; loose or defective cables or components; analog or digital or conversion failures; software failures; data path errors; or damaged, folded, torn, or perforated documents; or documents that have too much or too little contrast between the document background and the written portions cause poor image quality. Documents may also be of poor quality due to skew, rotation or inversion of the document, ink blots, finger prints, and stains of many origins. It is therefore important to detect and where possible correct poor image quality, and when not corrected, identify and process the document again or by another method to collect a quality document image.

It is important to differentiate between areas of the document, and decide on the quality of the image based on the overall quality detected. In the case of bank documents, some areas of the document are more important than others. For example, a check with overall poor quality may be usable if the quality of the payee, amount, and date areas of the check are acceptable. In processing a check, it is not overall image quality that is important. A check may have acceptable quality while the quality within the vital check areas, legal amount or other text information on a bank document, may independently be unacceptable. Bank documents have different vital image areas, for example, a check has different vital data when compared to a deposit slip. Current processing methods do not allow for the processing of different types of bank documents and processing different vital data positions within each type of bank document.

A need has arisen for a high speed image capture system which inspects each image and determines whether the image is acceptable based upon the quality of areas of the image rather than overall quality of the image. A need has further arisen for a method to examine payee, legal amount, and other text areas of a check and determine a quality confidence value for use in determining acceptable image quality.

SUMMARY OF THE INVENTION

A method of determining acceptable bank document quality is disclosed in which a digital image of the document is examined, the vital document areas located, and a quality confidence calculated. A determination of acceptable image quality is made using the calculated confidence values for the examined areas using two or more confidence techniques.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

The present invention processes bank documents as digital images, examines document images, assigns a "confidence level" by examining two or more areas of the document image and calculates a confidence level for each area. The confidence level for each document image is then assigned as a combination of the separately calculated area confidence levels.

Figure 1:
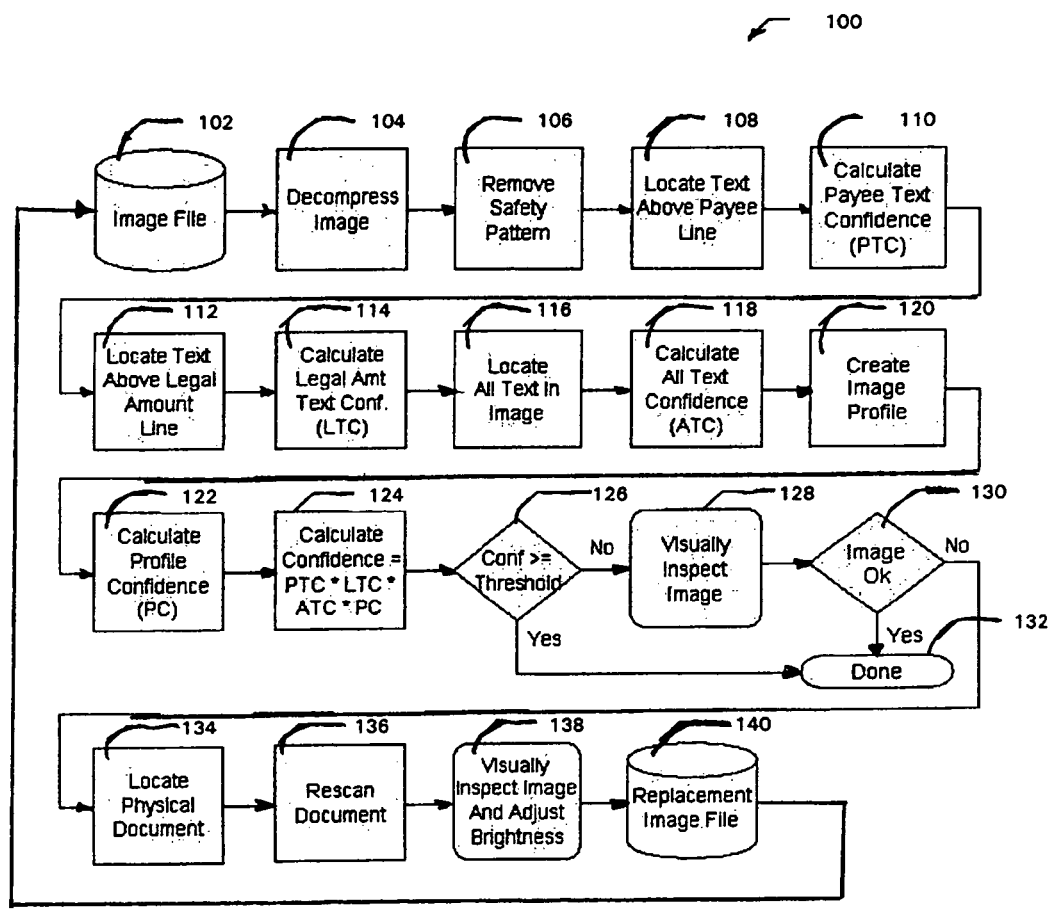
FIG. 1 is a block diagram illustrating the steps of the present method.

Referring to FIG. 1, the present method 100 begins with a file 102 of compressed document images. These images result from the output of the mechanical and electronic scanning of the document original. Any number of devices and techniques are used to collect these images. Devices such as the IBM 3897 Image Camera or NCR 7780 Check Sorter, provide such document image files. Each document image is examined in the following steps. The image from the image file 102 is decompressed at step 104 using decompression techniques according to the compression scheme used. Since many bank documents have a "safety pattern" on the document surface making it difficult to forge, the next step 106 is to digitally remove this pattern from the image. At step 106, the image is converted if necessary from grey-scale to black and white. In grey-scale, each pixel is assigned a number from 0 indicating white to some maximum, for example 255, indicating black. In step 106, all pixels with a grey-scale value less than some threshold, for example, 128, are changed to white, and those above the threshold are changed to black.

The payee text is located at step 108 by first locating the payee line on the check. If the line is found, all of the characters within a certain distance above the line (based on the document type) are located. The Payee Text Confidence (PTC) is calculated at step 110 by dividing the total number of pixels in the discovered characters by the expected value of the total number of pixels in the payee text area. For example, if the total number of pixels in the characters identified is 1,000 and the expected value is 2,000, then the confidence is 1,000/2,000=0.5. If the calculation equals a confidence level greater than 1.0, then 1.0 is assigned. The expected number of pixels is empirically determined by examining a number of known acceptable and unacceptable document images. Once set, this expected number is used for all documents of a document type.

The legal amount text is located at step 112 in the same way as the payee text, all the characters above a line based on document type are located, for example, within 0.5 cm of the line for checks. The Legal Amount Text Confidence (LTC) is calculated at step 114 by dividing the total number of pixels in the legal amount text area by the expected value of the total number of pixels in the legal amount text area.

All text in the image is located at step 116 by identifying groups of touching pixels, called a "pixel group." An examination of the pixel groups then identifies characters made up of pixel groups (similar to the technology of optical character recognition).

The All Text Confidence (ATC) is calculated at step 118 using the following formula:

ATC=1.0−(totalPixelGroups−totalCharacters)/totalCharacters

If the calculation results in a negative number (in the case that the total number of pixel groups is greater than twice the total number of characters), ATC is set to zero.

An image profile is created at step 120 by counting the number of black pixels in each row (horizontal) of the document. A Profile Confidence (PC) is calculated at step 122. The PC is calculated in the following steps:
1. The mean number of black pixels per row is calculated from the total number of black pixels, divided by the number of rows.
2. The variance and standard deviation of the distribution of black pixels in each row are calculated.
3. The black pixel density is computed by counting the number of black pixels in a fixed image area and dividing by the total number of pixels in that same area.
4. The Profile Confidence (PC) is determined by selecting the smaller of the standard deviation (std Dev) and pixel density (pDensity) measurement. Both values result from measurements of how well the standard deviation and the black pixel density fall within default ranges determined by experimentation or through user setting values.

stdDevFactor = (max allowable Std Deviation − min allowable Std Deviation)/2
if (Standard Deviation <= stdDevFactor)
stdDevConf = Standard Deviation * 100/stdDevFactor
else
stdDevConf = 200 − (stdDev * 100/stdDevFactor)
pDensityFactor = (max allowable pixel Density − min allowable pixel Density)/2
if (pixel Density <= pDenistyFactor)
pelDensityConf = (Pixel Density * 100/pelDensityFactor)
else
pelDensityConf = 200 − (Pixel Density 110/pelDensityFactor);
if (stdDevConf <0)
stdDevConf = 0;
if (pelDensityConf < 0)
pelDensityConf = 0;
if (stdDevConf <= pelDensityConf)
PC=stdDevConf
else
PC = pelDensityConf The image confidence (IC) is calculated at step 124 using the formula:

IC=PTC*LTC*ATC*PC

Where PTC is the payee text confidence, LTC is the legal amount text confidence, ATC is the all text confidence, and PC is the profile confidence. The Image Confidence is compared to a threshold for the document type of the image at step 126. If the IC is greater than or equal to the threshold, then the image is acceptable and no further processing occurs in step 132. If the IC is less than the threshold value for the document types, then the digital image is visually examined by a human operator for quality in the vital information area at step 128. If the examiner determines that the image is acceptable at step 130, then no further processing is done.

If the examiner determines that the image is unacceptable at step 130 then the original physical document is located at step 134, rescanned at step 136. The document may be modified, for example by removing dirt, before scanning. The document may be scanned using different equipment (for example, higher resolution) or different scanning parameters (for example light intensity or contrast). The rescanned image is visually inspected by an operator at step 138 where further modification and adjustments to the image may be made before the document image is placed in a replacement image file at step 140 for subsequent processing beginning at the step 102.

Figure 2:
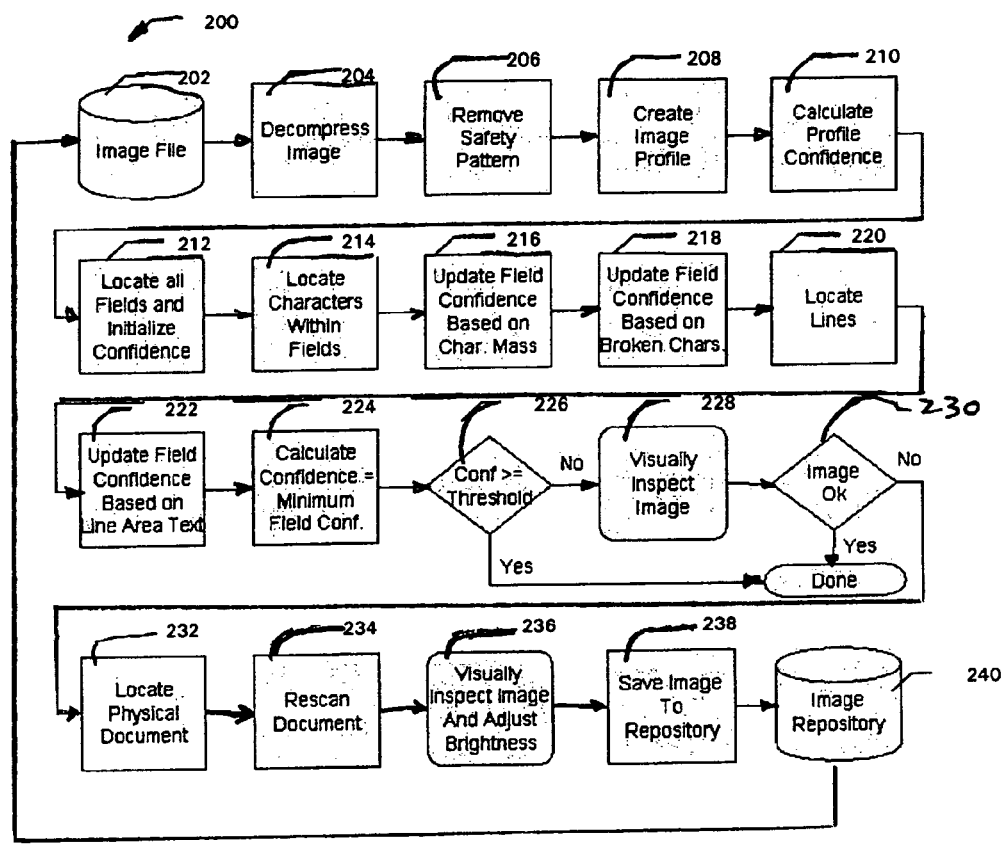
FIG. 2 is a block diagram illustrating the steps of an alternative method of the present method.

FIG. 2 illustrates a second embodiment of the present method. The method 200 beings with images in compressed digital form in an image file 202. Each image in turn is read from the file and decompressed at step 204. Any safety pattern is removed from the image at step 206. An image profile is constructed at step 208 as a histogram, taking each row of the image and counting the number of black pixels. This process includes removing any skew from the image before constructing the profile. From the document profile, a Profile Confidence (PC) is calculated at step 210 using the formula described in the first embodiment step 122.

With the Profile Confidence calculated, the text fields of the document image are located at step 212 according to the document type and each Field Confidence (FC) is initialized to the Profile Confidence. The text fields are different for each document type. For example, text fields in a check include a payee name, legal amount, courtesy amount, date, and signature, while a deposit slip text fields include legal amount, courtesy amount, date, and signature. For each document text field, the field characters are located at step 214 and the Field Confidence is altered based on the mass of each character within the field. The Field Confidence level (FC) is updated at step 216 for each character mass (CM) confidence level according to the following:
MinCM = constant
FC = Profile Confidence
For each character
CM = number of black pixels in the character
if CM<=MinCM then FC = FC (unchanged)
if CM>MinCM and CM<=2*MinCM then
   FC = FC * (1.0− (CM−MinCM)/MinCM)
if CM>2*MinCM then
   FC =0
Next character For each character between the minimum character mass (MinCM) and twice the minimum character mass (2*MinCM), the Field Confidence (FC) is reduced by the percentage that the character mass is greater than the minimum character mass. If any character is more than twice the minimum character mass, the Field Confidence FC is zero.

The Field Confidence is updated based on the number of "broken character" in the field at step 218, where a broken character is one in which parts of the character have dropped out, resulting in a character that is made up of several pixel groups. The field confidence FC is reduced by the formula:

$$FC=FC*(1.0-BC/TC)$$

Where BC is the number of broken characters and TC is the total number of characters in the field.

All pre-printed lines are located at step 220 using, for example, the Hough Transform or other well-known techniques that locate collinear line segments. Each text field is then examined for a pre-printed line. If a line is found, then all characters above the line to a distance (determined by the document type) are located. The Line Area Confidence (LAC) is calculated as the ratio of the number of pixels in the characters found above the line, divided by a predetermined expected number of pixels. The field confidence, FC, is then updated at step 222 by:

$$FC=FC*LAC$$

Where LAC is the Line Area Confidence

The overall confidence for the image is set as the minimum of the Field Confidence values for all text fields at step 224. The overall confidence value is compared to a threshold for the document type of the image at step 226. If the value is greater than or equal to the threshold, then the image is acceptable and no further processing occurs. If the value is less than the threshold value for the document type, then the digital image is visually examined by a human operator for quality in the vital information areas at step 228. If the examiner determines that the image is acceptable at step 230, then no further processing is done.

If the examiner determines that the image is unacceptable at step 230, then the original physical document is located at step 232, and rescanned at step 234. The document may be modified, for example by removing dirt, before scanning. The document may be scanned using different equipment (for example, higher resolution) or different scanning parameters (for example light intensity, color, or contrast). The rescanned image is visually inspected by an operator at step 236 where further modification and adjustments to the image may be made before the document image is saved at step 238. The image is then placed in a replacement image file 240 for subsequent processing beginning at the step 202.

In the present method a document image is assigned a confidence level by examining portions of the document. The higher the calculated confidence level, the better the document image is determined to be. Low confidence level documents are processed first by a human operator, then by rescanning the document until an acceptable image is captured. The confidence level emphasizes fields within the document so that if the vital document fields are acceptable, the document image as a whole is deemed acceptable.

It therefore can be seen that the present method determines an image to be of acceptable quality by considering the quality in vital areas of the document, and not the quality of the document as a whole. The method allows a document to be accepted if the vital areas images are acceptable, even though the whole document may be unacceptable. The method also would deem unacceptable a document where the vital areas are unacceptable even when the whole document image is acceptable quality. The present method determines images to be unacceptable where the poor quality is caused by the writing instrument, pen, or printer, or when the document background (for example, an artistic scene on a check) makes the vital document area content unacceptable as characters.

Other alteration and modification of the invention will likewise become apparent to those of ordinary skill in the art upon reading the present disclosure, and it is intended that the scope of the invention disclosed herein be limited only by the broadest interpretation of the appended claims to which the inventor is legally entitled.

We claim:

1. A method, comprising:
   (a) receiving a digital image of a document associated with a document type, the digital image including a plurality of black and white pixels arranged in rows;
   (b) locating at least two predefined portions of the digital image;
   (c) calculating an area confidence level for each of the predefined portions of the digital image as a function of a total number of black pixels located in the predefined portion relative to an expected number of black pixels for the predefined portion;
   (d) calculating a text confidence level as a function of a total number of pixel groups relative to a total number of characters, wherein each pixel group comprises a set of touching black pixels and each character comprises one or more pixel groups, wherein calculating the text confidence level comprises:
   subtracting the total number of characters from the total number of pixel groups to produce a first quantity,
   dividing the first quantity by the total number characters to produce a second quantity, and
   subtracting the second quantity from 1 to produce the text confidence level, and if the text confidence level is negative, setting the text confidence level equal to 0;
   (e) calculating an image profile confidence level as a function of a black pixel distribution and a black pixel density;
   (f) calculating an overall image confidence level as a function of the area confidence level, the text confidence level, and the image profile confidence level; and
   (g) storing the digital image as a result of determining that the overall image confidence level is greater than or equal to a threshold value associated with the document type of the image.

2. The method of claim 1 wherein the document is a bank check and locating the at least two predefined portions of the digital image includes locating the payee line of the check and the legal amount text of the check.

3. The method of claim 1, wherein the digital image is a first digital image of the document received from scanning equipment, and further comprising, prior to performing step (g):
   determining that the overall image confidence level is less than the threshold value;
   receiving a second digital image of the document;
   replacing the first digital image with the second digital image, wherein the second digital image is treated as the digital image; and repeating steps (b) through (f).

4. The method of claim 3, wherein the second digital image is a result of one or more of (i) a modification of the document prior to receiving the second digital image, (ii) a modification of the scanning equipment, or (iii) a modification to a scanned image prior to receiving.

5. The method of claim 1, wherein calculating the area confidence level comprises:
dividing the total number of black pixels in the predefined portion by the expected number of black pixels for the predefined portion to produce a quantity;
if the quantity is less than or equal to 1, setting the area confidence level equal to the quantity; and
if the quantity is greater than 1, setting the area confidence level equal to 1.

6. The method of claim 1, wherein calculating the image profile confidence level comprises:
calculating a standard deviation of the black pixel distribution in each row;
calculating the black pixel density as a ratio of a total number of black pixels in an image area to a total number of pixels in the image area; and
setting the image profile confidence level equal to the smaller of (i) a function of the standard deviation and (ii) a function of the black pixel density.

7. The method of claim 6, wherein calculating the image profile confidence level further comprises:
adjusting the standard deviation of the black pixel distribution based on a maximum allowable standard deviation and a minimum allowable standard deviation; and
adjusting the black pixel density based on a maximum allowable black pixel density and a minimum allowable black pixel density.

8. The method of claim 1, wherein calculating the overall image confidence level comprises setting the overall image confidence level equal to a product of the area confidence level, the text confidence level, and the image profile confidence level.

9. A method, comprising:
determining that a first overall confidence level of a first digital image of a document associated with a document type is less than a threshold value associated with the document type;
receiving a second digital image of the document, the digital image including a plurality of black and white pixels arranged in rows;
locating at least two predefined portions of the second digital image;
calculating an area confidence level for each of the predefined portions of the second digital image as a function of a total number of black pixels located in the predefined portion relative to an expected number of black pixels for the predefined portion;
calculating a text confidence level as a function of a total number of pixel groups relative to a total number of characters, wherein each pixel group comprises a set of touching black pixels and each character comprises one or more pixel groups, wherein calculating the text confidence level comprises:
subtracting the total number of characters from the total number of pixel groups to produce a first quantity,
dividing the first quantity by the total number characters to produce a second quantity, and
subtracting the second quantity from 1 to produce a text confidence level, and
if the text confidence level is negative, setting the text confidence level equal to 0;
calculating an image profile confidence level as a function of a black pixel distribution and a black pixel density;
calculating a second overall image confidence level as a function of the area confidence level, the text confidence level, and the image profile confidence level; and
storing the second digital image as a result of determining that the second overall image confidence level is greater than or equal to the threshold value.

10. The method of claim 9, wherein the second digital image is a result of one or more of (i) a modification of the document prior to receiving the second digital image, (ii) a modification of the scanning equipment, or (iii) a modification to a scanned image prior to receiving.

11. The method of claim 9, wherein the document is a bank check and locating the at least two predefined portions of the second digital image includes locating the payee line of the check and the legal amount text of the check.

12. The method of claim 9, wherein calculating the area confidence level comprises:
dividing the total number of black pixels in the predefined portion by the expected number of black pixels for the predefined portion to produce a quantity;
if the quantity is less than or equal to 1, setting the area confidence level equal to the quantity; and
if the quantity is greater than 1, setting the area confidence level equal to 1.

13. The method of claim 9, wherein calculating the image profile confidence level comprises:
calculating a standard deviation of the black pixel distribution in each row;
calculating the black pixel density as a ratio of a total number of black pixels in an image area to a total number of pixels in the image area; and
setting the image profile confidence level equal to the smaller of (i) a function of the standard deviation and (ii) a function of the black pixel density.

14. The method of claim 13, wherein calculating the image profile confidence level further comprises:
adjusting the standard deviation of the black pixel distribution based on a maximum allowable standard deviation and a minimum allowable standard deviation; and
adjusting the black pixel density based on a maximum allowable black pixel density and a minimum allowable black pixel density.

15. The method of claim 9, wherein calculating the second overall image confidence level comprises setting the second overall image confidence level equal to a product of the area confidence level, the text confidence level, and the image profile confidence level.

* * * * *